United States Patent Office 3,155,912
Patented Nov. 3, 1964

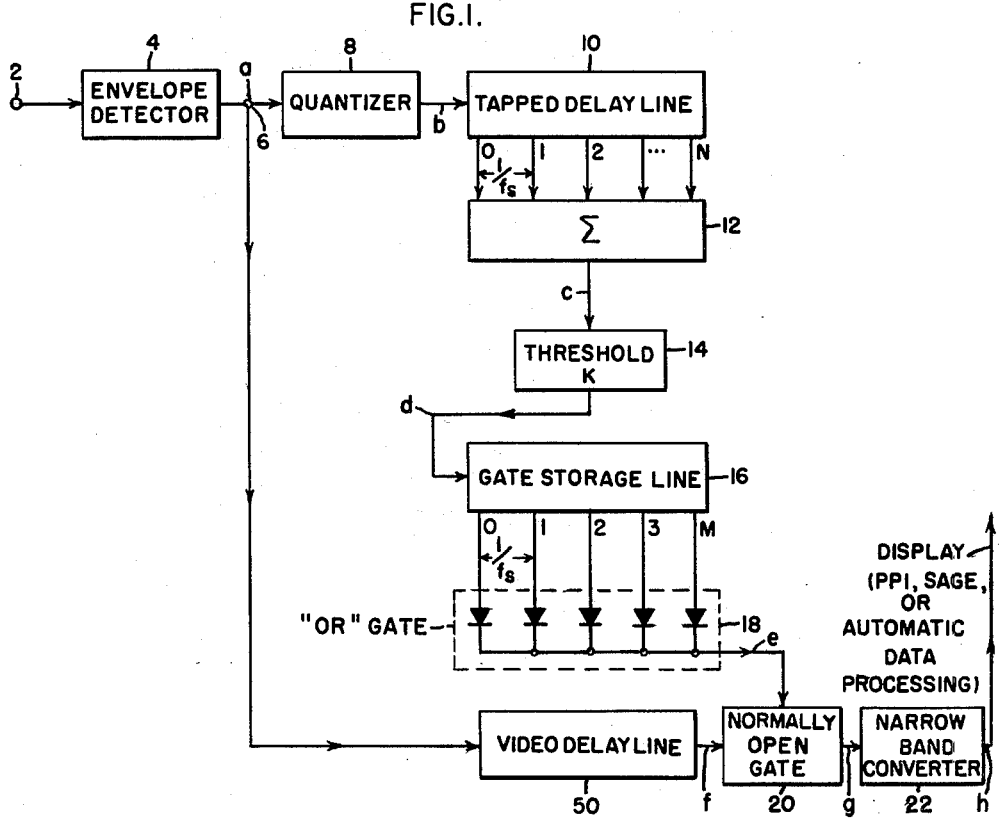

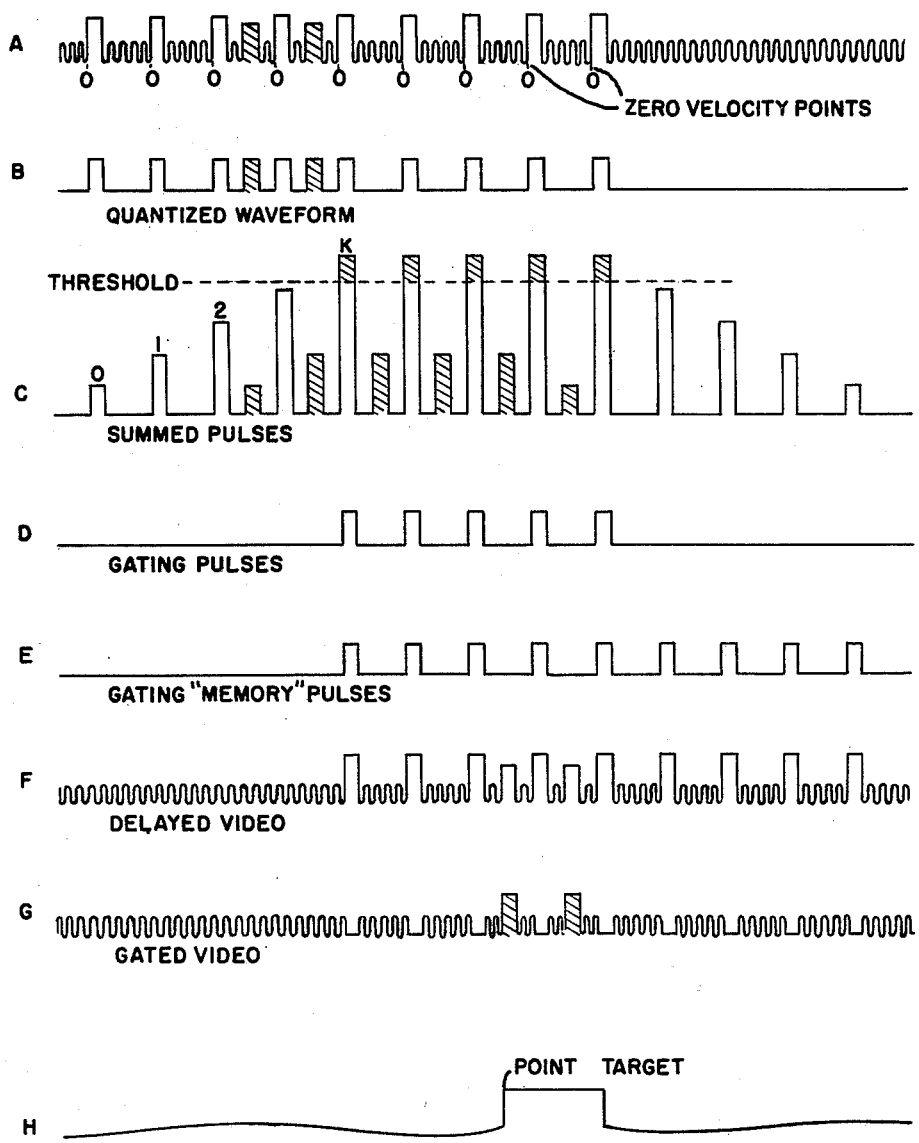

3,155,912
AUTOMATIC GATING CIRCUIT
Sidney Applebaum, Liverpool, Paul W. Howells, Morrisville, and Zenn Zenon, North Syracuse, N.Y., assignors to General Electric Company, a corporation of New York
Filed May 1, 1961, Ser. No. 106,972
9 Claims. (Cl. 328—108)

This invention relates to automatic electronic gate circuits, and in particular, it relates to gate circuits capable of distinguishing and eliminating undesired signals from desired signals where the undesired signals consist of a relatively larger number of periodic pulses which are intermingled with the desired signals consisting of a relatively small number of periodic pulses.

In the arts of spectrum analysis and frequency scanning, progress has been made toward separating undesired signals from desired signals. This is especially true in certain filtering devices, such as are shown in the patents of Sidney Applebaum entitled "Frequency Scanning Filter Arrangement," Patent Number 3,026,475, and "Spectrum Analyzer," Patent Number 2,997,650, both of which have been assigned to the assignee of the present invention. In these patents, means are described for obtaining output pulses which are time oriented in such a way as to make it possible to determine the frequency spectrum of an original plurality of input signals. For the operation of certain types of display devices, such as those which indicate frequency (or Doppler frequency) plotted against amplitude, the prior art devices provide satisfactory output signals. However, the prior art devices have been shown to provide output signals which are unsatisfactory for direct use with certain other types of displays, such as those in which the data has been converted first from Doppler frequency to velocity and then to range to provide signals for a PPI display or Plan Position Indicator display. In this latter type of display, it frequently happens that certain undesired signals which were easily distinguished as indications of discrete parts of the frequency spectrum or as velocities become indistinguishable from desired positions on the PPI.

Having in mind the limitations of the prior art, it is a principal object of this invention to provide an electronic gate circuit which will remove a wide variety of interfering signals which are mixed with desired received signals.

It is a further object of this invention to provide means for distinguishing signals exhibiting a wide frequency spectrum and indicating a wide range extent from signals exhibiting a narrow frequency spectrum and therefore indicating a shallow range extent and to provide means for transmitting those signals exhibiting the narrow frequency spectrum or shallow range extent.

It is another object of this invention to provide means for distinguishing between a long sequence of coherent or periodic pulses which is intermingled with a short sequence of coherent or periodic pulses.

It is still another object of this invention to enable a radar circuit to distinguish a short train of pulses from a long train of pulses where the short train of pulses represents the reflections from a fast moving target having a relatively shallow range dispersal and the long train of pulses represents the reflections from a slowly moving or stationary object having a relatively extensive range dispersal such as a large cloud, extensive chaff or clutter.

It is yet another object of this invention to provide an automatic gate for operating on radar returns which is capable of rejecting extended returns from clutter, weather and chaff, while passing less extended returns from point targets.

It is yet a further object of this invention to provide means for receiving signals such as are supplied by frequency scanning filters and refining those signals further to adapt them to indicators of the plan position type.

The foregoing objects, and others ancillary thereto, we prefer to accomplish as follows:

In accordance with a preferred embodiment of the invention, a signal consisting of a plurality of intermingled trains of periodic or coherent pulses is provided from an envelope detector to two parallel circuits. The first of these circuits includes means to limit the amplitude of the pulses to a standard level and then to transmit the resulting quantized pulses to a tapped delay line. The pulses are supplied from the tapped delay line through a plurality of circuits to a summing circuit which will add up all of the pulses appearing at each of the taps. As a result of this summing action, new trains of pulses will be provided at an output terminal of the summing device. These new trains of pulses will vary in amplitude as the result of the operation of the delay line and the summing circuit in such a way that among the new pulses the ones having the greatest amplitude will result from summing the portion of the original pulse chains or trains which has the longest train of periodic pulses. The new pulse train having the next highest amplitude will result from the summation of the train of the original periodic pulses having the next greatest length, and so on.

The pulse trains appearing at the output of the summing circuit are then supplied to a threshold limiting circuit which will discard all of the pulses having an amplitude less than a certain minimum and transmit the upper portions of those having an amplitude above the minimum. The pulses transmitted from the threshold circuit are supplied to a storage line having a plurality of taps. The taps are connected to a "greatest of" circuit, or "or" gate, which will provide gating pulses as its output signal in proportion to the pulses appearing on the delay line. These gating pulses will be provided to a normally open gate which will be closed for periods determined by the gating pulses.

The second principal path, or parallel circuit, of this preferred embodiment of the invention, which was coupled to the original pulse trains, is connected through a delay line of suitable length to supply a complete set of the original pulse trains to the normally open gate. The gate then functions, in response to the gating pulses referred to in the last paragraph, to permit the pulses occurring in short trains to pass through, but closes down to shut-out the pulses occurring in long trains as indicated before. After the desired pulses have passed through the normally open gate they are provided to means which will transform them into usable pulses for operation of display devices, such as PPI indicators, or to automatic data processing apparatus.

The novel features that are considered characteristic of this invention are set forth with particularity in the appended claims. The invention itself, however, both as to its organization and its method of operation, together with additional objects and advantages thereof, will best be understood from the following description of a specific embodiment when read in connection with the accompanying drawings, in which:

FIG. 1 illustrates in bloc diagram form a preferred embodiment of the invention, and FIG. 2 illustrates the waveforms prevailing at various points in the embodiment of the invention illustrated in FIG. 1.

Turning first to FIG. 1, there is shown at the upper left hand corner of the figure a terminal 2 which represents the input terminal of the circuit. The signal applied at terminal 2 must be a pulse modulated waveform in which the pulses consist of one or more trains of periodic or envelope coherent pulses having a repetition frequency $f_s$, such as may be provided by apparatus constructed in accordance with the Applebaum applications which have previously been discussed. This input signal is first applied to an envelope detector indicated at 4 which serves to remove the I-F carrier and provide at terminal 6 a train or a plurality of trains of periodic pulses. Trains of pulses are indicated as being present on the terminal 6 by the letter a and the waveform may be of the general shape shown in FIG. 2A. The waveform shown in FIG. 2A represents two distinct trains of periodic pulses, where the open rectangles represent pulses which had a particular Doppler shift of wide frequency spectrum when delivered to the Applebaum device and the shaded blocks represent pulses which had a different Doppler shift of narrow frequency range or spectrum when first applied to the Applebaum device.

The pulse trains at terminal 6 are supplied over separate lines to the quantizer 8 and the video delay line 50 for purposes which will be made apparent as the description progresses. The quantizer in a preferred embodiment comprises a first component, including a threshold limiter which only accepts pulses having a magnitude greater than a certain minimum, and a second component, including a Schmidt trigger or multi-vibrator biased to provide an output pulse of fixed amplitude for each input pulse transmitted to it by the first component. In this way the pulse train supplied to the quantizer 8 is, in effect, clipped so that the pulses appearing as outputs from the quantizer at point b have the form indicated in FIG. 2B. This signal or plurality of pulses at b is supplied to a tapped delay line 10 having a plurality of taps $(N+1)$ spaced $1/f_s$ seconds apart. Sequential pulses appear simultaneously at the taps of the delay line and are fed over the lines labelled 0, 1, 2, . . . N to the summing circuit at 12 which provides a waveform at c such as that shown in FIG. 2C. A train of P pulses into the delay line will produce $P+N$ pulses in the output of the summing network.

The train of $P+N$ pulses is then examined to determine trains of pulses having a number larger than a selected magnitude which may be designated as K, which is the criterion for determining the threshold selected by the threshold circuit indicated by the block 14. The threshold circuit 14 is sensitive only to pulses with an amplitude of K or more times the quantized pulse amplitude, where K is equal to or less than the quantity $(N+1)$. This threshold circuit thus will block the passage of all the pulses indicated in FIG. 2C which have an amplitude less than that indicated by the dotted line labelled "threshold" and will pass that part of the pulses which extend above the threshold level. Since this threshold requires K input pulses before it can make a decision to pass a particular pulse train, and since the amplitude of the summing network output pulses will fall below the threshold level as the delay line empties, the number of gating pulses appearing at d (as shown in FIG. 2D) in the threhold output is $(P+N-2K+2)$.

In order to gate out a train of P pulses, the circuit must add a minimum of $(2K-N-2)$ gating pulses to this quantity. This is done by storing the gating pulses in a second delay line with $(N+1)$ taps $1/f_s$ seconds apart. This second delay line is shown as the gate storage line 16 with output lines 0, 1, 2, . . . M as shown. By means of a "greatest of" combination which is indicated as an "or" gate at 18, a signal at any tap of this gate storage line will produce a gating pulse at e, in the output signal of the circuit. This output, as shown in FIG. 2E, will equal $(P+N-2K+2)+N=[P+2(N+1-K)]$ pulses. These output pulses will operate the normally open gate indicated at 20 to block out the undesired pulses in the envelope-detected trains of pulses from terminal 6 which will have been stored, prior to entering the gate, in the third delay line 50 which is labelled a video delay line. This video delay line 50 will serve to compensate for the N pulse delay of delay line 10. Gating will occur only in pulse trains in which the threshold circuit 14 has detected the presence of a number of pulses equal to or exceeding K. In the circuit shown in FIG. 1 the number of gating pulses exceeds the number of input pulses in order to insure gating out pulse trains in which occasional gaps appear. The circuit is designed to gate out all pulses that are in delay line 10 at the time the threshold K is equalled or exceeded.

The output of the normally open gate 20, with the undesired pulses removed and only the desired pulses remaining at g, as indicated in FIG. 2G, may be converted into narrow-band video signals of normal pulse width at h by the narrow-band converter 22, which thus discards information as to frequency, velocity, and the like. This "clean" video signal or point target signal (as shown in FIG. 2H) may now be used to operate display circuits such as a standard PPI-scope, or it may be routed directly into automatic data processing systems.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are, therefore, intended to cover and embrace any such modifications within the limits of the true spirit and scope of the invention.

What we claim and desire to secure by Letters Patent of the United States is:

1. An electronic gate circuit for separating a short train of periodic pulses from a long train of periodic pulses intermingled therewith comprising, means for receiving said trains of intermingled pulses, means for processing all the pulses of each periodic train to provide control pulses, normally open gating means responsive to the control pulses to close and block the transmission of selected pulses, and means for supplying said intermingled short train of periodic pulses and long train of periodic pulses to said gating means for selection of the desired train of periodic pulses.

2. An electronic gate circuit for receiving a short train of periodic pulses intermingled with a long train of periodic pulses and for separating said short train of periodic pulses from said long train of periodic pulses comprising, means for receiving said trains of intermingled pulses, means for processing all the pulses of a periodic train to provide control pulses, normally open gating means responsive to the control pulses to close and block the transmission of selected pulses, and means for transmitting said short train of periodic pulses and said long train of periodic pulses to said gating means for selection of the desired train of periodic pulses.

3. An electronic gate circuit for separating a short train of periodic pulses from a long train of periodic pulses commingled therewith comprising, means for processing said commingled pulses to produce pulses all of equal amplitude, means for summing each of said pulses of equal amplitude with the pulses periodic therewith to provide pulses of varying amplitudes, means for discriminating between said new pulses of varying amplitudes to select those exceeding a pre-selected amplitude to use as blocking pulses, normally conducting gating means responsive to said blocking pulses for inhibiting the transmission of selected pulses, and means for transmitting said short train of periodic pulses and said long train of periodic pulses commingled therewith to said gating means, whereby said gating means responsive to said blocking pulses transmits said short train of periodic pulses and inhibits the transmission of said long train of periodic pulses.

4. An electronic gate circuit for separating a short train of periodic pulses from a long train of periodic pulses commingled therewith comprising, detecting means for removing said trains of periodic pulses from an I-F carrier, means for processing said commingled pulses to produce pulses all of equal amplitude, means for summing each of said pulses of equal amplitude with the pulses periodic therewith to provide pulses of different amplitudes, means for discriminating between said new pulses of different amplitudes to select those exceeding a pre-selected amplitude to use as blocking pulses, normally conducting gating means responsive to said blocking pulses for inhibiting the transmission of selected pulses, and means for transmitting said short train of periodic pulses and said long train of periodic pulses commingled therewith to said gating means, whereby said gating means responsive to said blocking pulses transmits said short train of periodic pulses and inhibits the transmission of said long train of periodic pulses.

5. An electronic gate circuit for separating a short train of periodic pulses from a long train of periodic pulses commingled therewith comprising, quantizer means for quantizing said pulses to produce pulses all of equal amplitude, tapped delay means for orienting each of said pulses of equal amplitude in time relationship with a plurality of periodic pulses, means for summing each of said pulses of equal amplitude in the said time relationship to provide new pulses of varying amplitudes, means for discriminating between said new pulses of varying amplitudes to select those exceeding a pre-selected amplitude as blocking pulses, normally conducting gating means responsive to said blocking pulses for inhibiting the transmission of selected pulses, and means for transmitting said short train of periodic pulses and said long train of periodic pulses commingled therewith to said gating means to select said short train of periodic pulses.

6. An electronic gate circuit for separating a short train of periodic pulses from a long train of periodic pulses commingled therewith comprising, means for quantizing said pulses to produce pulses all of equal amplitude, tapped delay means for orienting each of said pulses of equal amplitude in time relationship with a plurality of periodic pulses, means for summing each of said pulses of equal amplitude in the said time relationship to provide new pulses of varying amplitudes, means for discriminating between said new pulses of varying amplitudes to select those exceeding a pre-selected amplitude as control pulses, means responsive to said control pulses for providing a train of blocking pulses, normally conducting gating means responsive to said blocking pulses for inhibiting the transmission of selected pulses, and means for transmitting said short train of periodic pulses and said long train of periodic pulses commingled therewith to said gating means to select said short train of periodic pulses.

7. An electronic gate circuit for separating a short train of periodic pulses from a long train of periodic pulses commingled therewith comprising, means for quantizing said pulses to produce pulses all of equal amplitude, tapped delay means for orienting each of said pulses of equal amplitude in time relationship with a plurality of periodic pulses, means for summing each of said pulses of equal amplitude in the said time relationship to provide new pulses of varying amplitudes, means for discriminating between said new pulses of varying amplitudes to select those exceeding a pre-selected amplitude as control pulses, means responsive to said control pulses including a gate storage line and an "or" gate circuit for providing a train of blocking pulses, normally conducting gating means responsive to said blocking pulses for inhibiting the transmission of selected pulses, and means for transmitting said short train of periodic pulses and said long train of periodic pulses commingled therewith to said gating means to select said short train of periodic pulses.

8. In an automatic electronic gating circuit, means for enabling a radar circuit to distinguish between commingled trains of pulses including a short train of periodic pulses representing a small but rapidly moving target and a long train of periodic pulses representing a large but slowly moving object comprising, means for quantizing said pulses to produce pulses all of equal amplitude, tapped delay means for orienting each of said pulses of equal amplitude in time relationship with a plurality of periodic pulses, means for summing each of said pulses of equal amplitude in the said time relationship to provide new pulses of varying amplitudes, means for discriminating between said new pulses of varying amplitudes to select those exceeding a pre-selected amplitude as control pulses, means responsive to said control pulses including a gate storage line and an "or" gate circuit for providing a train of blocking pulses, normally conducting gating means responsive to said blocking pulses for inhibiting the transmission of selected pulses, and means for transmitting said short train of periodic pulses and said long train of periodic pulses commingled therewith to said gating means to select said short train of periodic pulses.

9. In an automatic electronic gating circuit, means for enabling a radar circuit to distinguish between commingled trains of pulses including a short train of periodic pulses representing a small moving target and a long train of periodic pulses representing a large object at substantially the same range but moving at a different radial velocity, means for quantizing said pulses to produce pulses all of equal amplitude, tapped delay means for orienting each of said pulses of equal amplitude in time relationship with a plurality of periodic pulses, means for summing each of said pulses of equal amplitude in the said time relationship to provide new pulses of varying amplitudes, means for discriminating between said new pulses of varying amplitudes to select those exceeding a pre-selected amplitude as control pulses, means responsive to said control pulses including a gate storage line and an "or" gate for providing a train of blocking pulses, normally conducting gating means responsive to said blocking pulses for inhibiting the transmission of selected pulses, and means for transmitting said short train of periodic pulses and said long train of periodic pulses commingled therewith to said gating means to select said short train of periodic pulses.

References Cited in the file of this patent

UNITED STATES PATENTS

| | | |
|---|---|---|
| 2,776,366 | Estes | Jan. 1, 1957 |
| 2,909,657 | Aurell | Oct. 20, 1959 |
| 2,985,715 | Campbell | May 23, 1961 |